(12) United States Patent
Khatod et al.

(10) Patent No.: US 9,335,964 B2
(45) Date of Patent: May 10, 2016

(54) GRAPHICS SERVER FOR REMOTELY RENDERING A COMPOSITE IMAGE AND METHOD OF USE THEREOF

(71) Applicant: Nvidia Corporation, Santa Clara, CA (US)

(72) Inventors: Sarika Bhimkaran Khatod, Bangalore (IN); David Stears, Santa Clara, CA (US); Rudi Bloks, Santa Clara, CA (US); Murralidharan Chilukoor, Bangalore (IN)

(73) Assignee: Nvidia Corporation, Santa Clara, CA (US)

( * ) Notice: Subject to any disclaimer, the term of this patent is extended or adjusted under 35 U.S.C. 154(b) by 285 days.

(21) Appl. No.: 13/945,567

(22) Filed: Jul. 18, 2013

(65) Prior Publication Data
US 2015/0022548 A1 Jan. 22, 2015

(51) Int. Cl.
*G09G 5/14* (2006.01)
*G06F 3/14* (2006.01)

(52) U.S. Cl.
CPC ............... *G06F 3/1415* (2013.01); *G09G 5/14* (2013.01); *G09G 2340/02* (2013.01); *G09G 2340/0407* (2013.01)

(58) Field of Classification Search
None
See application file for complete search history.

(56) References Cited

U.S. PATENT DOCUMENTS

| | | | |
|---|---|---|---|
| 7,957,603 B2 * | 6/2011 | Tu et al. | 382/233 |
| 2011/0122063 A1 * | 5/2011 | Perlman et al. | 345/161 |
| 2011/0269508 A1 * | 11/2011 | Libault et al. | 455/566 |
| 2012/0162712 A1 * | 6/2012 | Shibao | 358/1.15 |
| 2012/0324358 A1 * | 12/2012 | Jooste | 715/733 |
| 2013/0210522 A1 * | 8/2013 | Dharmapurikar | 463/31 |
| 2014/0035900 A1 * | 2/2014 | Slavin et al. | 345/419 |
| 2014/0267336 A1 * | 9/2014 | Jeganathan et al. | 345/545 |
| 2014/0267898 A1 * | 9/2014 | Raviv et al. | 348/390.1 |

* cited by examiner

*Primary Examiner* — Maurice L McDowell, Jr.
*Assistant Examiner* — Donna J Ricks

(57) ABSTRACT

A graphics server for remotely rendering a composite image and a method of use thereof. One embodiment of the graphics server includes: (1) a graphics renderer configured to render updates for a plurality of graphics windows within the composite image and (2) a display processing unit (DPU) configured to identify changed portions of the composite image and provide the changed portions to an encoder for encoding and subsequent transmission.

22 Claims, 3 Drawing Sheets

GRAPHICS SERVER FOR REMOTELY RENDERING A COMPOSITE IMAGE AND METHOD OF USE THEREOF

TECHNICAL FIELD

This application is directed, in general, to computer graphics processing and, more specifically, to partial frame compositing and encoding of rendered graphics for transmission to a display.

BACKGROUND

The utility of personal computing was originally focused at an enterprise level, putting powerful tools on the desktops of researchers, engineers, analysts and typists. That utility has evolved from mere number-crunching and word processing to highly programmable, interactive workpieces capable of production level and real-time graphics rendering for incredibly detailed computer aided design, drafting and visualization. Personal computing has more recently evolved into a key role as a media and gaming outlet, fueled by the development of mobile computing. Personal computing is no longer resigned to the world's desktops, or even laptops. Robust networks and the miniaturization of computing power have enabled mobile devices, such as cellular phones and tablet computers, to carve large swaths out of the personal computing market.

Mobile computing has transformed conventional notions of information accessibility and media dissemination. Network enabled devices are the new norm, connecting a wide variety of devices over a variety of networks. This has led to a proliferation of conventional, or "mainstream" content, as well as non-conventional, amateur or home-made content. Going forward, not only will this content be available on virtually any mobile device, in addition to conventional outlets, but mobile devices can play the role of a media hub, gaining access to a plethora of content and forwarding it, or "pushing it out," to one or more display devices, including televisions, computer monitors, projectors or any device capable of receiving, decoding and displaying streamed content. While typically thought of as clients, mobile devices, and more generally, virtually any computing device can play the role of a "media server."

In a typical server-client remote graphics processing arrangement, graphics content is stored, retrieved and rendered on a server. Frames of rendered content are then captured and encoded, generally at a frame rate that is either specified by a managing device or is simply part of a configuration. Captured and encoded frames are then packetized and transmitted over a network to a client as a video stream (often including audio). The client simply decodes the video stream and displays the content. Such a "thin-client" application can be easily portable to a variety of platforms.

As mobile computing continues to evolve with the growing focus on content accessibility and dissemination, the role of mobile devices will continue to expand. Typical client server boundaries will continue to fade and more people will rely on mobile devices as their client and server, depending on the content of interest.

SUMMARY

One aspect provides a graphics server for remotely rendering a composite image. In one embodiment, the graphics server includes: (1) a graphics renderer configured to render updates for a plurality of graphics windows within the composite image and (2) a display processing unit (DPU) configured to identify changed portions of the composite image and provide the changed portions to an encoder for encoding and subsequent transmission.

Another aspect provides a method of remotely rendering a composite image. In one embodiment, the method includes: (1) rendering updates to at least one graphics window within the composite image, (2) identifying changed portions of the composite image, (3) compositing the changed portions into a partial frame, and (4) providing the changed portions to an encoder for encoding and subsequent transmission.

Yet another aspect provides a graphics processing system for driving a remote display. In one embodiment, the graphics processing system includes: (1) a graphics processing unit (GPU) having a graphics renderer configured to employ scene data and rendering commands to periodically render respective updates to a plurality of graphics windows within a composite image, (2) a display processing unit (DPU) configured to identify changed portions of the composite image, (3) a display engine configured to fetch the changed portions and composite the changed portions into a partial frame, (4) an encoder configured to employ the partial frame to encode a full frame, (5) a central processing unit (CPU) configured to generate the scene data and rendering commands, and to packetize encoded frames, and (6) a network interface controller (NIC) configured to transmit packetized encoded frames toward a client.

BRIEF DESCRIPTION

Reference is now made to the following descriptions taken in conjunction with the accompanying drawings, in which.

DETAILED DESCRIPTION

Figure 1:
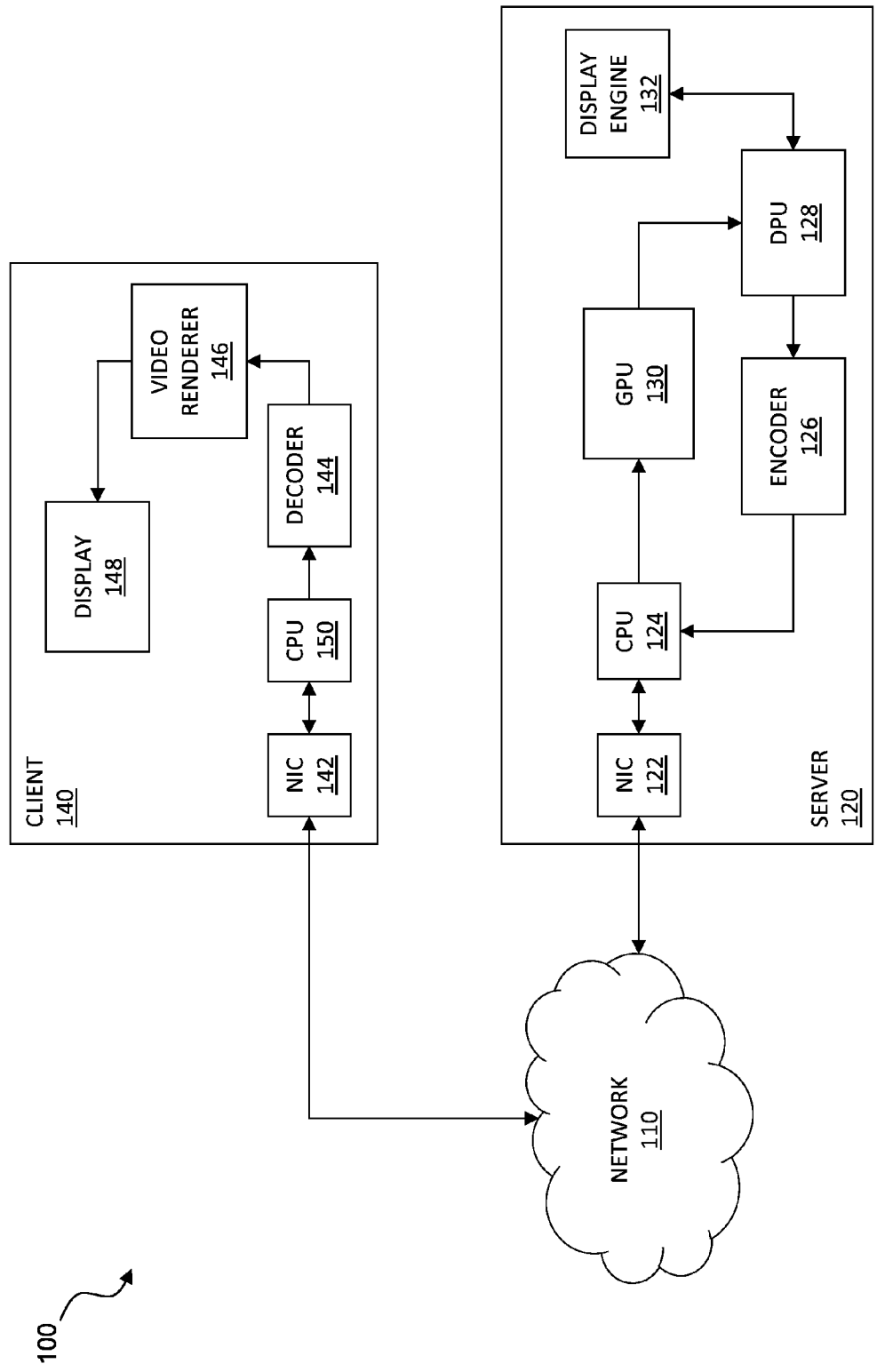
FIG. 1 is a block diagram of one embodiment of a server-client graphics processing system.

A significant source of inefficiencies in remote graphics processing is the continuous updating of multiple graphics windows. It is common for a server device to run several applications at once, each generating its own graphics window for display. The source applications often update their respective graphics windows at different rates. It is left to the rendering pipeline and the display pipeline to manifest these changes to the display.

Typically, as an application commands an update to its graphics window, it issues new data and rendering commands to the GPU, which then renders the update into a frame buffer. This would occur at a rate specified for the application, assuming the GPU has resources to carry out the rendering. Each application goes through this process, potentially at different rates. The display pipeline fetches the latest rendered frame for each graphics window from the appropriate frame buffers. The graphics windows are then composited into a composite frame, or image. To build the composite image, each graphics window is translated, or scaled from its respective input coordinate system into a composition coordinate system, or "composition domain." This scaling is known as pre-composition scaling. Once each graphics window has undergone pre-composition scaling, the entire frame is scaled into an output viewport coordinate system, or "raster domain." A traditional computing device, having a local display, would then display the composite image. For remote displays, the composite image is written to another buffer, from which an encoder can fetch and encode the frame. The encoded frame can then be packetized by the CPU and ultimately transmitted via a NIC.

Inefficiencies arise because of the asynchronous update of the various graphics windows. Whenever a single graphics window changes, the entire composite image is regenerated by fetching all the graphics windows from the frame buffers and re-compositing, regardless of whether a particular graphics window has changed. The re-composited image is then encoded, packetized, transmitted, received, decoded and displayed.

It is realized herein that bandwidth can be conserved by compositing only the changed portions of the composite image. It is further realized herein this can be accomplished by identifying graphics windows that have undergone their respective periodic change and compositing those graphics windows into a partial frame. It is realized herein that bandwidth can be further conserved as the encoder only needs to fetch the partial frame and gain access to the previously encoded frame. The full frame can then be encoded, packetized and transmitted, based at least partially on the partial frame. Alternatively, it is realized herein, the changed portion of each graphics window can be identified, and the partial frame is composited of only these changed portions, rather than one or more whole graphics window. Yet another alternative, it is realized herein, is to identify rows of macroblocks of the composite image, and to composite and encode only those macroblocks. Each of these approaches, among others, yields lower bandwidth and power consumption.

Before describing various embodiments of the graphics server and method for remotely rendering a composite image introduced herein, a graphics processing system within which the graphics server and method may be embodied or carried out will be described.

FIG. 1 is a block diagram of one embodiment of a server-client graphics processing system 100. System 100 includes a network 110 through which a server 120 and a client 140 communicate. Server 120 represents the central repository of content, processing and rendering resources. Client 140 is a consumer of that content and those resources. In certain embodiments, server 120 is freely scalable and has the capacity to provide that content and those services to many clients simultaneously by leveraging parallel and apportioned processing and rendering resources. In addition to any limitations on the power, memory bandwidth or latency of server 120, the scalability of server 120 is limited by the capacity of network 110 in that above some threshold of number of clients, scarcity of network bandwidth requires that service to all clients degrade on average.

Server 120 includes a network interface card (NIC) 122, a central processing unit (CPU) 124, an encoder 126, a display processing unit (DPU) 128, a GPU 130 and a display engine 132. Upon an election on server 120, or in certain embodiments, upon request from client 140, graphics content is recalled from memory via one or more applications executing on CPU 124. As is convention for graphics applications, games for instance, CPU 124 reserves itself for carrying out high-level operations, such as determining position, motion and collision of objects in a given scene. From these high level operations, CPU 124 generates rendering commands that, when combined with the scene data, can be carried out by GPU 130. For example, rendering commands and data can define scene geometry, lighting, shading, texturing, motion, and camera parameters for a scene.

GPU 130 executes rendering procedures according to the rendering commands generated by CPU 124, yielding a stream of frames of video for one or more graphics windows. The frames of video pass to DPU 128, which determines the changed portions of the graphics windows and directs display engine 132 to fetch those portions. Display engine 132 fetches the changed portions and composites them into a partial frame. DPU 128 then directs encoder 126 to fetch the partial frame for encoding.

Encoder 126, using the partial frame, formats the full frame for packetizing and transmission, possibly employing a video compression algorithm such as the H.264 standard arrived at by the International Telecommunication Union Telecommunication Standardization Sector (ITU-T) or the MPEG-4 Advanced Video Coding (AVC) standard from the International Organization for Standardization/International Electrotechnical Commission (ISO/IEC). Alternatively, the video stream may be encoded into Windows Media Video® (WMV) format, VP8 format, or any other video encoding format.

CPU 124 prepares the encoded video stream for transmission, which is passed along to NIC 122. NIC 122 includes circuitry necessary for communicating over network 110 via a networking protocol such as Ethernet, Wi-Fi or Internet Protocol (IP). NIC 122 provides the physical layer and the basis for the software layer of server 120's network interface.

Client 140 receives the transmitted video stream for display. Client 140 can be a variety of personal computing devices, including: a desktop or laptop personal computer, a tablet, a smart phone or a television. Client 140 includes a NIC 142, a decoder 144, a video renderer 146, a display 148 and a CPU 150. NIC 142, similar to NIC 122, includes circuitry necessary for communicating over network 110 and provides the physical layer and the basis for the software layer of client 140's network interface. The transmitted video stream is received by client 140 through NIC 142. CPU 150 unpacks the received video stream and prepares it for decoding.

The video stream is then decoded by decoder 144. Decoder 144 should match encoder 126, in that each should employ the same formatting or compression scheme. For instance, if encoder 136 employs the ITU-T H.264 standard, so should decoder 144. Decoding may be carried out by either a client CPU or a client GPU, depending on the physical client device. Once decoded, all that remains in the video stream are the raw rendered frames. The rendered frames are processed by a basic video renderer 146, as is done for any other streaming media. The rendered video can then be displayed on display 148.

Having described a server-client remote graphics processing system within which the graphics server and method for remotely rendering a composite image may be embodied or carried out, various embodiments of the graphics server and method will be described.

Figure 2:
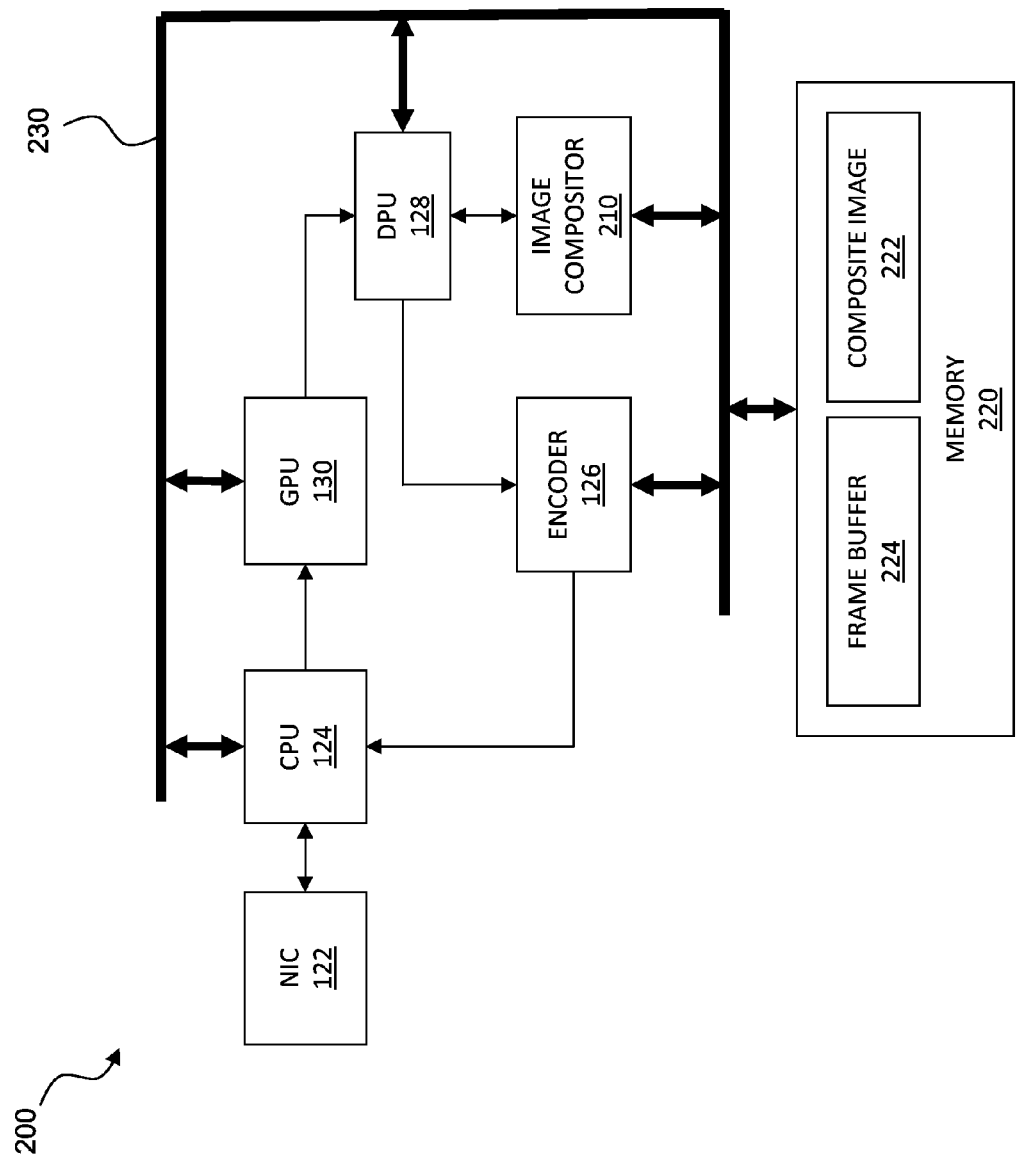
FIG. 2 is a block diagram of one embodiment of a graphics server.

FIG. 2 is a block diagram of one embodiment of a graphics server 200, such as server 120 of FIG. 1. Graphics server 200 includes NIC 122, CPU 124, encoder 126, DPU 128 and GPU 130, all of FIG. 1. Additionally, graphics server 200 includes an image compositor 210, a memory 220 and a data bus 230, through which the various elements of graphics server 200 gain access to memory 220. Memory 220 is configured to store a frame buffer 224 and a composite image 222.

As in server 120 of FIG. 1, basic operation of graphics server 200 includes rendering one or more graphics windows, identifying changed portions, compositing those portions into a partial frame and encoding the full frame for subsequent transmission to a client. CPU 124 executes one or more applications by which it generates rendering commands and either generates, or recalls from memory 220, scene data for rendering. GPU 130 carries out the rendering commands on the scene data to produce rendered graphics windows, which are then written to frame buffer 224 via data bus 230.

DPU 128 gains access to frame buffer 224 via data bus 230 and identifies which of those graphics windows has changed, and directs image compositor 210 to those changed graphics windows. In certain embodiments, DPU 128 draws a bounding box around the changed graphics windows and then maps that bounding box to macroblocks in the raster domain. The bounding box, now consisting of one or more macroblocks, is scaled into the composition domain by applying inverse post-composition scaling. From the composition domain, each of the changed graphics windows can be scaled to its respective input coordinate system in the source domain by applying inverse pre-composition scaling. Given the coordinates of the changed graphics windows in the source domain, DPU 128 can properly direct image compositor 210 to the changed portions of the composite image.

Image compositor 210 fetches the changed graphics windows from frame buffer 224 via data bus 230 and forms a new composite image, or partial frame. The partial frame is written to memory as composite image 222 via data bus 230. DPU 128 then directs encoder 126 to composite image 222.

Encoder 126 gains access to the partial frame in memory 220 and encodes a full frame based on the partial frame and the previously encoded frame. A variety of encoding schemes could be used by encoder 126, including H.264, WMV and MPEG-4. CPU 124 retrieves encoded frames from memory and "packs" them for transmission via NIC 122. This preparation typically involves packetizing the data from the frame buffer and possibly additional encoding for the transmission protocol.

Figure 3:
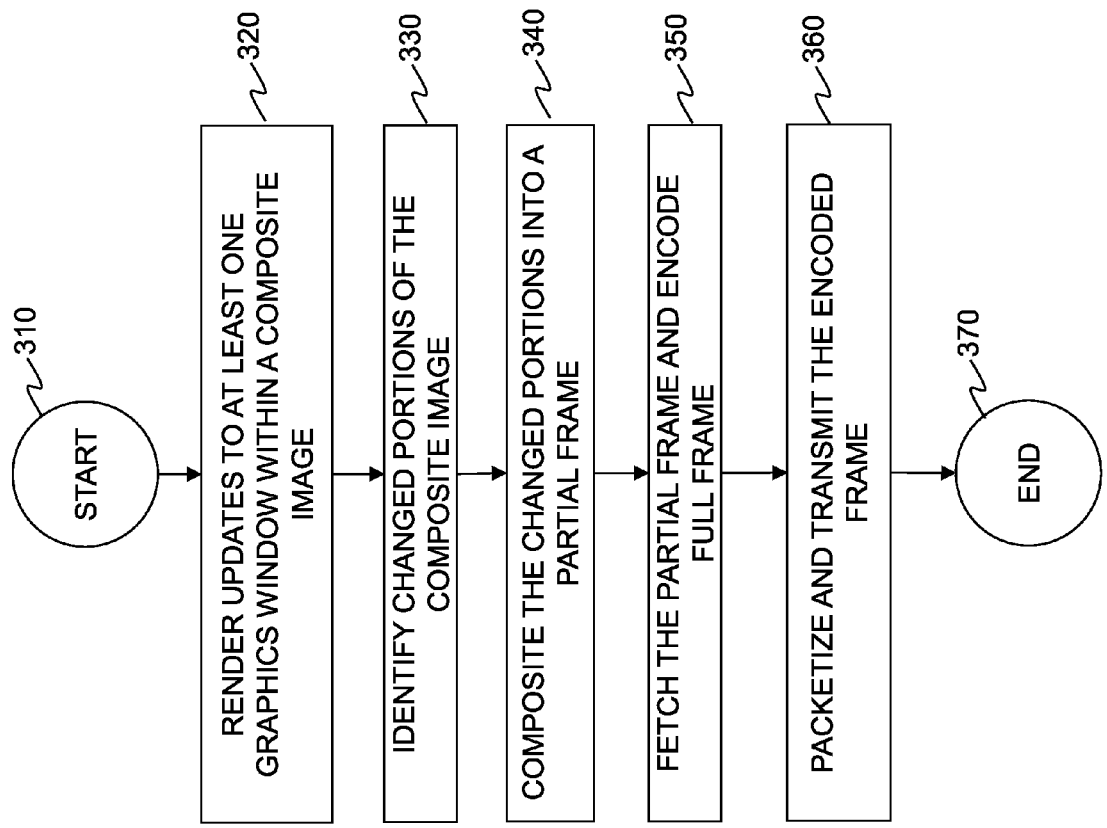
FIG. 3 is a flow diagram of one embodiment of a method for remotely rendering a frame of a composite image.

FIG. 3 is a flow diagram of one embodiment of a method of remotely rendering a composite image. The method begins in a start step 310. In a rendering step 320, updates to at least one graphics window, within the composite image, are rendered. Individual graphics windows within a composite image are often updated at different rates, so it is common that one graphics window changes, while another does not. The changed portions of the composite image are identified in an identification step 330. Once identified a bounding box is drawn that encompasses all the graphics windows that have changed. This bounding box is drawn in an output viewport coordinate system, which is sometimes referred to as the "raster domain." The output viewport is essentially the display view.

The output viewport is divided into macroblocks of m-by-n pixels. The size of the macroblocks may depend on a variety of factors, including display resolution, image source resolution, memory sizes, memory architectures and others. For example, resolutions are often powers-of-two, which suggests macroblock dimensions along the same scale, such as 8×8 or 16×16. Macroblocks are not necessarily square, but there are efficiencies in using square macroblocks.

The bounding box drawn in the raster domain is expanded, or "snapped" to the nearest macroblock boundaries. Inverse post-composition scaling is then applied to scale the bounding box into a "composition domain." Once in the composition domain, each changed graphics window is scaled to its respective input coordinate system by applying inverse pre-composition scaling, yielding coordinates for each changed graphics window in a "source domain" that can be used for fetching the rendered updates, or changed portions for that graphics window.

In certain embodiments, extra pixels are added to each dimension of the bounding box and changed graphics windows before their respective inverse scaling. This expansion helps avoid edge artifacts.

The changed portions are then composited into a partial frame in a compositing step 340. The partial frame contains only the update regions of composite image. In certain embodiments, changed portions identified in identification step 330 are fetched by an image compositor, which then carries out compositing step 340. The image compositor combines the changed portions into a composite image that would typically be an output toward a display. In some embodiments, the image compositor is part of a display engine that retrieves rendered frames for one or more graphics windows from memory, scales, composites and pushes the composite image out to the display. Additionally, the image compositor or display engine writes the composite image back to memory as the partial frame.

In certain embodiments, the partial frame is made up of one or more full, or whole graphics window. Identification step 330 identifies which graphics windows are changed. In alternate embodiments, the partial frame is made up of only the portions of graphics windows that have changed, rather than the whole graphics window. In these embodiments, identification step 330 identifies which regions of the graphics windows have changed.

Continuing the embodiment of FIG. 3, in an encoding step 350, the partial frame is fetched and a full frame is encoded. The partial frame is encoded as part of the full frame that is formed from the partial frame and a previously encoded frame stored in memory. The encoding scheme employed in encoding step 350 can be any scheme suitable for transmission of a video stream. This includes H.264, MPEG-4 and others. Once encoded, the partial frame is packetized and transmitted toward a client display device in a packetize and transmit step 360. Packetizing is typically carried out by a CPU, and transmission is typically through a NIC. Client display devices can be a variety of devices, including a computer monitor, television, projector, personal computer, or a mobile computing device such as a smartphone or tablet. The client display device is generally capable of receiving, decoding and displaying transmitted frames. Some display devices have built in frame storage. The combination of the transmitted partial frame and frames stored at the display can be used to render a complete composite image. The method then ends in an end step 370.

Those skilled in the art to which this application relates will appreciate that other and further additions, deletions, substitutions and modifications may be made to the described embodiments.

What is claimed is:

1. A graphics server for remotely rendering a composite image, comprising:
   a graphics renderer configured to render updates for a plurality of graphics windows within said composite image;
   a display processing unit (DPU) configured to identify changed portions of said composite image, scale said changed portions to respective coordinate systems of said plurality of graphic windows and provide said changed portions to an encoder for encoding and subsequent transmission.

2. The graphics server recited in claim 1 wherein said encoder is a H.264 encoder.

3. The graphics server recited in claim 1 further comprising an image compositor configured to composite said changed portions into a partial frame.

4. The graphics server recited in claim 1 further comprising a central processing unit (CPU) operable to execute an application to generate scene data and rendering commands to be carried out by said graphics renderer on said scene data, thereby rendering at least one of said plurality of graphics windows, and configured to packetize encoded frames of said composite image.

5. The graphics server recited in claim 1 wherein said changed portions include macroblocks containing graphics windows, of said plurality of graphics windows, having undergone said updates.

6. The graphics server recited in claim 1 wherein said changed portions include only macroblocks containing portions of said plurality of graphics windows that have changed.

7. The graphics server recited in claim 1 wherein said DPU is further configured to:
   determine a set of changed windows, of said plurality of graphics windows, having undergone said updates;
   map said set onto a plurality of macroblocks; and
   scale said plurality of macroblocks to said respective coordinate systems of said plurality of graphic windows for subsequent fetching.

8. The graphics server recited in claim 1 wherein said encoder is operable to encode a full frame including said changed portions.

9. A method of remotely rendering a composite image, comprising:
   rendering updates to at least one of multiple graphic windows within said composite image;
   identifying changed portions of said composite image and scaling said changed portions to respective coordinate systems of said graphic windows;
   compositing said changed portions into a partial frame; and
   providing said changed portions to an encoder for encoding and subsequent transmission.

10. The method recited in claim 9 wherein said changed portions are whole graphics windows having said updates.

11. The method recited in claim 9 wherein said changed portions are a plurality of macroblocks within which said updates are rendered.

12. The method recited in claim 11 wherein said identifying includes:
    mapping changed portions of said frame onto said plurality of macroblocks; and
    scaling said plurality of macroblocks to said respective coordinate systems of said graphic windows.

13. The method recited in claim 12 wherein said compositing includes:
    fetching scaled macroblocks from a buffer;
    compositing fetched scaled macroblocks into said partial frame; and
    writing said partial frame to another buffer for use in said encoding.

14. The method recited in claim 9 further comprising:
    packetizing an encoded frame; and
    transmitting said encoded frame toward a client display.

15. The method recited in claim 9 wherein said changed portions are portions of said at least one graphics window having undergone said updates.

16. The method recited in claim 9 wherein said encoding includes gaining access to a previously encoded frame and employing said partial frame and said previously encoded frame in encoding a full frame for said subsequent transmission.

17. A graphics processing system for driving a remote display, comprising:
    a graphics processing unit (GPU) having a graphics renderer configured to employ scene data and rendering commands to periodically render respective updates to a plurality of graphics windows within a composite image;
    a display processing unit (DPU) configured to identify changed graphics windows among said plurality of graphics windows of said composite image and scale said changed graphics windows to respective coordinate systems of said changed graphics windows;
    a display engine configured to fetch said changed graphics windows and composite said changed graphics windows into a partial frame;
    an encoder configured to employ said partial frame to encode a full frame;
    a central processing unit (CPU) configured to generate said scene data and rendering commands, and to packetize encoded frames; and
    a network interface controller (NIC) configured to transmit packetized encoded frames toward a client.

18. The graphics processing system recited in claim 17 wherein said DPU is further configured to:
    map a bounding box containing said changed graphics windows to a plurality of macroblocks; and
    apply inverse post-composition scaling to said bounding box and inverse pre-composition to said changed graphics windows, thereby scaling said changed graphics windows to said respective coordinate systems of said changed graphics windows.

19. The graphics processing system recited in claim 17 wherein said display engine is further configured to write said partial frame to a buffer to be fetched by said encoder.

20. The graphics processing system recited in claim 17 wherein said graphics processing system is contained within a mobile computing device.

21. The graphics processing system recited in claim 20 wherein said mobile computing device is a smart phone.

22. The graphics processing system recited in claim 17 wherein said composite image is a remote desktop.

* * * * *